US007847905B2

(12) United States Patent
Jun et al.

(10) Patent No.: US 7,847,905 B2
(45) Date of Patent: Dec. 7, 2010

(54) FFS MODE LCD AND METHOD OF MANUFACTURING THE SAME

(75) Inventors: Tae Hyun Jun, Icheon-si (KR); Seung Jun Baek, Icheon-si (KR)

(73) Assignee: Hydis Technologies Co., Ltd., Gyeonggi-do (KR)

( * ) Notice: Subject to any disclaimer, the term of this patent is extended or adjusted under 35 U.S.C. 154(b) by 107 days.

(21) Appl. No.: 12/264,713

(22) Filed: Nov. 4, 2008

(65) Prior Publication Data

US 2009/0115951 A1    May 7, 2009

(30) Foreign Application Priority Data

Nov. 7, 2007 (KR) ............... 10-2007-0113225
Jul. 29, 2008 (KR) ............... 10-2008-0074199

(51) Int. Cl.
*G02F 1/1343* (2006.01)
*H01L 21/77* (2006.01)
(52) U.S. Cl. .................. 349/141; 349/187; 438/30; 257/E21.535
(58) Field of Classification Search .......... 349/141, 349/41, 42, 43, 107, 108, 106, 138, 139, 349/147, 158, 187, 191; 438/30; 257/E21.535
See application file for complete search history.

(56) References Cited

U.S. PATENT DOCUMENTS

| 6,256,081 | B1 | 7/2001 | Lee et al. ................ 349/141 |
| 6,266,118 | B1 | 7/2001 | Lee et al. ................ 349/141 |
| 6,977,705 | B1 * | 12/2005 | Chiang et al. ............ 349/138 |
| 2002/0067453 | A1 * | 6/2002 | Kim et al. ................ 349/141 |
| 2007/0222907 | A1 * | 9/2007 | Onogi et al. ............... 349/42 |
| 2007/0242204 | A1 * | 10/2007 | Fujita et al. .............. 349/141 |
| 2009/0115951 | A1 * | 5/2009 | Jun et al. ................ 349/141 |

OTHER PUBLICATIONS

Kim et al.; "A Novel Portable LCD Using a New AFFS Technology for Outdoor Readability"; Journal of the SID; 2006; pp. 1077-1081; vol. 14, No. 12; Society for Information Display, US.
Lee et al.; "Invited Paper: A Novel Outdoor Readability of Portable TFT-LCD with AFFS Technology"; SID 06 Digest; pp. 1079-1082; 2006; ISSN0006X-0966X/06/3702.

* cited by examiner

*Primary Examiner*—Brian M Healy
(74) *Attorney, Agent, or Firm*—The Webb Law Firm (57) ABSTRACT

Provided are a fringe field switching (FFS) mode liquid crystal display (LCD) and a method of manufacturing the same. The FFS mode LCD includes a second transparent electrode having a plurality of slits and bars, disposed apart from a first transparent electrode with an insulating layer interposed between the first and second transparent electrodes, in a pixel region to apply a voltage level to a liquid crystal layer and control an amount of transmitted light. From a plan view, bar-shaped patterns having a specific width in a direction substantially parallel to a length direction of the slits are formed in the middles of the respective slits or in the middles of bars.

19 Claims, 11 Drawing Sheets

FFS MODE LCD AND METHOD OF MANUFACTURING THE SAME

CROSS-REFERENCE TO RELATED APPLICATION

This application claims priority to and the benefit of Korean Patent Application Nos. 2007-113225, filed Nov. 7, 2007, and 2008-74199, filed Jul. 29, 2008, the disclosures of which are incorporated herein by reference in their entirety.

BACKGROUND

1. Field of the Invention

The present invention relates to a liquid crystal display (LCD) and a method of manufacturing the LCD, and more particularly, to a fringe field switching (FFS) mode LCD having a wide viewing angle characteristic whose outdoor readability characteristic and screen quality are improved in a transmissive mode, and a method of manufacturing the FFS mode LCD.

2. Discussion of Related Art

An FFS mode LCD has been developed to improve a low aperture ratio and transmittance of an in-plane switching (IPS) mode LCD.

In the FFS mode LCD, a common electrode and a pixel electrode are formed of a transparent conductor to enable a higher aperture ratio and transmittance than the IPS mode LCD. Also, a distance between the common electrode and the pixel electrode is smaller than a distance between upper and lower glass substrates to generate a fringe field between the common electrode and the pixel electrode and operate all liquid crystal molecules as well as liquid crystal molecules existing in upper parts of the electrodes. As a result, the FFS mode LCD can have improved transmittance. Conventional art relating to the FFS mode LCD has been disclosed in, for example, U.S. Pat. Nos. 6,256,081 and 6,266,118.

Such a conventional FFS mode LCD includes: a lower substrate including a plurality of pixels consisting of a transparent pixel electrode, a transparent common electrode and a thin film transistor (TFT); an upper substrate consisting of a color filter formed of red, green and blue color filter patterns arranged by turns to correspond to the pixels; and a black matrix (BM).

Together with the transparent common electrodes, the transparent pixel electrodes generate an electric field to control transmittance operating a liquid crystal molecules interposed between the lower and upper substrates.

Meanwhile, LCDs are generally classified into a transmissive LCD using a backlight and a reflective LCD using natural light as a light source. Since the transmissive LCD uses a backlight as a light source, it is possible to provide bright images in a dark environment. However, the transmissive LCD has high power consumption due to the backlight and poor outdoor readability. On the other hand, the reflective LCD uses surrounding natural light as a light source without a backlight, thus having low power consumption and being usable outdoors. However, the reflective LCD cannot be used in a dark environment.

To solve these problems of the conventional transmissive LCDs and reflective LCDs, an advanced FFS (AFFS) mode LCD (a new FFS mode LCD) that is a transmissive FFS mode LCD having improved indoor and outdoor readability has been suggested in a paper "A Novel Outdoor Readability of Portable TFT-LCD with AFFS" (K. H. Lee et al., SID 06, 2006, p 1079) written by the present applicant.

According to the AFFS mode LCD, an electric field is appropriately generated at the interface region between a slit and a bar of a pixel electrode, and thus a liquid crystal is smoothly operated. However, in the middles of the respective slit and in the middles of bars, a distance between operating electrodes increases, and the intensity of the electric field decreases. Furthermore, in these regions, the direction of electric field is not continuous (abruptly changed). Thus, the liquid crystal is not smoothly operated and disclination occurs. These problems need solutions. In particular, the problems cause non-uniform alignment of the liquid crystal and deteriorate screen quality at high voltage.

In addition, a reflective region is formed to increase outdoor visibility, and internal reflection increases outdoor brightness. However, since other regions except for an opening region (aperture region) are used as the reflective region, the reflective region is not large and its effect is not good enough.

SUMMARY OF THE INVENTION

The present invention is directed to providing a fringe field switching (FFS) mode liquid crystal display (LCD) whose screen quality is improved by reducing effect of disclination through a relatively simple change in a manufacturing process, and a method of manufacturing the FFS mode LCD.

The present invention is also directed to providing an FFS mode LCD having an additional reflective region and improved outdoor readability, and a method of fabricating the FFS mode LCD.

One aspect of the present invention provides a fringe field switching (FFS) mode liquid crystal device (LCD) in which a lower substrate, an upper substrate and a liquid crystal layer interposed between the substrates are included, each pixel region is defined on the lower substrate by gate lines and data lines formed in crossing directions, and switching devices are disposed at intersections of the gate lines and the data lines, the FFS mode LCD comprising: a first transparent electrode and a second transparent electrode, wherein the second transparent electrode have a plurality of slits and bars, disposed apart from a first transparent electrode with an insulating layer interposed between the first and second transparent electrodes, in the pixel region to apply a voltage level to the liquid crystal layer and control an amount of transmitted light, and wherein, from a plan view, bar-shaped patterns having a specific width in a direction substantially parallel to a length direction of the slits are formed in the middles of the respective slits or in the middles of the bars.

The bar-shaped patterns may be formed of a material constituting the data lines, and the first transparent electrode may have a slit shape or a plate shape.

The respective bar-shaped patterns have a narrower upper width than lower width, based on the substrate (a trapezoid shape with sectional view).

The FFS mode LCD may further include an additional bar connecting the bar-shaped patterns each other at edges of the slits.

The bar-shaped patterns may be formed of a material having a high thermal conductivity.

Another aspect of the present invention provides a method of manufacturing a fringe field switching (FFS) mode liquid crystal display (LCD) in which a lower substrate, an upper substrate and a liquid crystal layer interposed between the substrates are included, each pixel region is defined on the lower substrate by gate lines and data lines formed in crossing directions, and switching devices are disposed at intersections of the gate lines and the data lines, the method comprising:

forming a first transparent electrode on the lower substrate; and forming the gate lines, a gate insulating layer, an active layer, the data lines, an insulating layer and a second transparent electrode on the first transparent electrode in sequence, the second transparent electrode having a plurality of slits and bars, wherein in forming the data lines, from a plan view, bar-shaped patterns having a specific width are formed in a direction substantially parallel to a length direction of slits of the second transparent electrode in the middles of the respective slits or in the middles of the respective bars together with the data lines.

Yet another aspect of the present invention provides a method of manufacturing a fringe field switching (FFS) mode liquid crystal display (LCD) in which a lower substrate, an upper substrate and a liquid crystal layer interposed between the substrates are included, each pixel region is defined on the lower substrate by gate lines and data lines formed in crossing directions, and switching devices are disposed at intersections of the gate lines and the data lines, the method comprising: forming the gate lines and bar-shaped patterns having a specific width on the lower substrate; and forming a gate insulating layer, an active layer, a first transparent electrode, the data lines, an insulating layer and a second transparent electrode on the structure, the second transparent electrode having a plurality of slits and bars, and wherein, in forming the patterns, from a plan view, the bar-shaped patterns are formed in a direction substantially parallel to a length direction of slits of the second transparent electrode in the middles of the respective slits or in the middles of bars.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

A liquid crystal display (LCD) according to an exemplary embodiment of the present invention includes a lower substrate, an upper substrate, and a liquid crystal layer interposed between the lower substrate and the upper substrate. On the lower substrate, pixel regions are defined by electrodes formed in crossing directions to apply a voltage to the liquid crystal layer.

First Exemplary Embodiment

Figure 1:
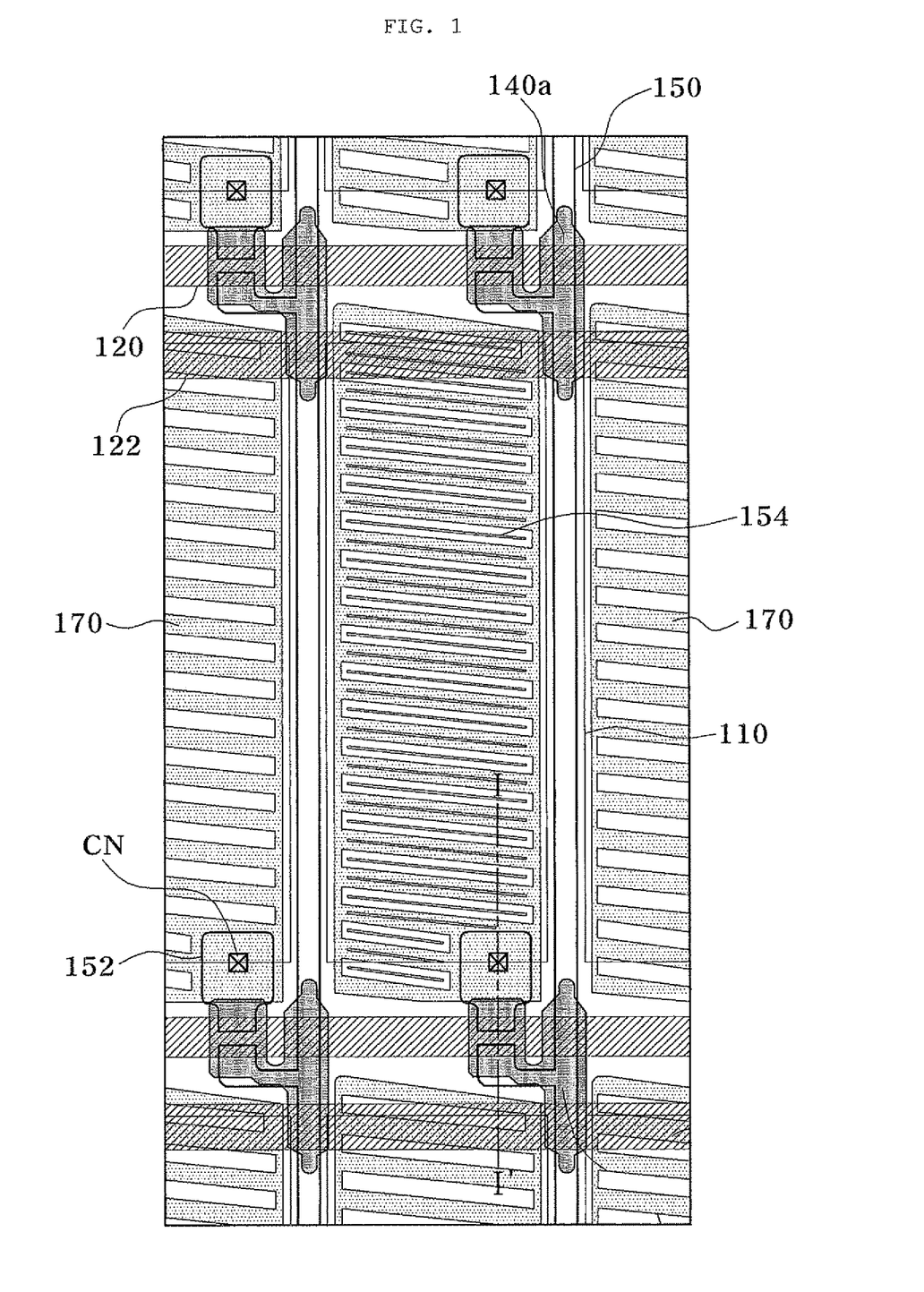
FIG. 1 is a plan view of a part of pixel regions formed on a lower substrate of a fringe field switching (FFS) mode liquid crystal display (LCD) according to a first exemplary embodiment of the present invention.
Figure 2:
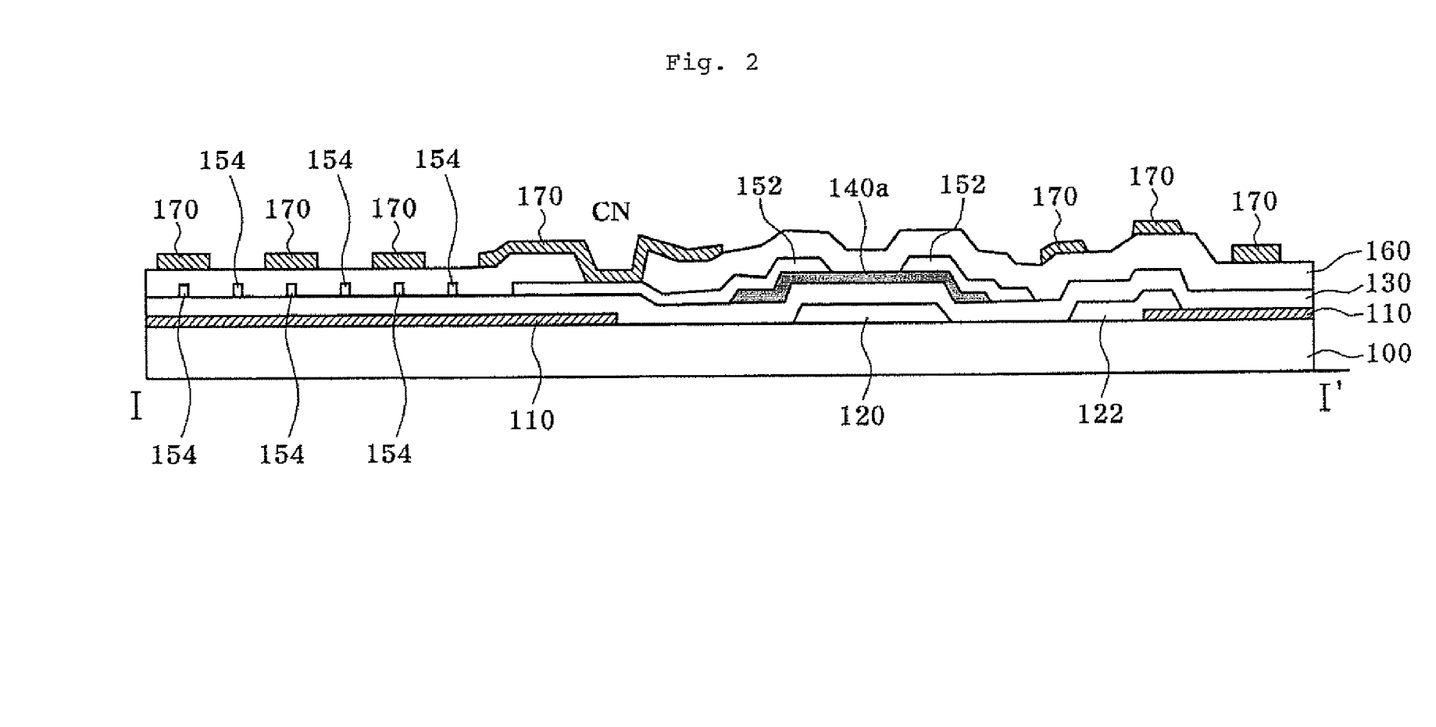
FIG. 2 is a cross-sectional view taken along line I-I' of FIG. 1.

FIG. 1 is a plan view of a part of pixel regions formed on a lower substrate of a fringe field switching (FFS) mode LCD according to a first exemplary embodiment of the present invention, and FIG. 2 is a cross-sectional view taken along line I-I' of FIG. 1.

Referring to FIGS. 1 and 2, in the FFS mode LCD according to the first exemplary embodiment of the present invention, gate lines 120 and data lines 150 are arranged on a lower substrate 100 to cross each other, and thin film transistors (TFTs), which are switching devices, are disposed at the intersections of the gate lines 120 and the data lines 150. In a unit pixel region defined by the gate lines 120 and the data lines 150, a transparent pixel electrode 170 that has a plurality of slits forming specific angles with respect to a transparent common electrode 110 and the gate line 120 is disposed apart from the transparent common electrode 110 with an insulating layer 160 interposed therebetween. FIG. 1 illustrates an example in which the transparent common electrode 110 is formed in a plate shape, but the transparent common electrode 110 may be also formed to have a plurality of slits.

The slits of the transparent pixel electrode 170 form a specific angle, e.g., 2 to 30 degrees, with respect to the gate lines 120. The transparent common electrode 110 and the transparent pixel electrode 170 are insulated from each other by the insulating layer 160, and a gate insulating layer 130 is interposed between the gate line 120 and an active layer 140a.

Meanwhile, a common bus line 122 is arranged parallel to the gate line 120 at the pixel edge spaced apart from the gate line 120. The common bus line 122 is electrically connected with the transparent common electrode 110 and applies a common signal to the common electrode 110.

In addition, an upper substrate (not shown) is formed over the lower substrate 100 to be spaced apart from the lower substrate 100 by a specific distance. The upper substrate has a black matrix region, a color filter and an overcoat layer, and is bonded to the lower substrate 100 with a liquid crystal layer including a plurality of liquid crystal molecules interposed therebetween.

According to the first exemplary embodiment, from the plan view illustrated in FIG. 1, bar-shaped patterns 154 having a specific width in a direction substantially parallel to the length direction of the slits are formed in the middles of the respective slits of the transparent pixel electrode 170 and in the middles of spaces, i.e., electrodes, between the slits. FIG. 1 illustrates an example in which the patterns 154 are formed both in the middles of the respective slits and in the middles of spaces between the slits, but in practice, the patterns 154 may be only formed in the middles of the respective slits or in the middles of respective bars. The present invention has the desired effect in both cases.

The patterns 154 can be fabricated using various materials without any special limitation, and can be formed by depositing a layer through a deposition process. In this exemplary embodiment, however, the patterns 154 are fabricated using a metal constituting the data line 150 to facilitate the process.

Recently, LCD products are frequently used outdoors, so outdoor visibility and power consumption are important for outdoor use. To decrease power consumption, a driving voltage may be reduced. Thus, research and development of a driving method at low voltage is ongoing. From this viewpoint, according to an exemplary embodiment of the present invention, it may be efficient to form patterns in the middles of respective slits or in the middles of spaces, i.e., electrodes, between the slits using a material having a high thermal conductivity. This will be described in detail below.

In an FFS mode LCD having slits, a driving voltage may vary according to a position where a liquid crystal is arranged. More specifically, in the middles of spaces between slits or in the middles of the slits, a lateral electric field is relatively weak, and the liquid crystal is mainly rotated by elastic torque. Thus, the driving voltage of the positions is higher than that of other positions. Therefore, when patterns are formed of a material having a relatively high thermal conductivity in the middles of bars or in the middles of the slits, a liquid crystal temperature can increase faster than at other positions by outdoor sunlight, etc., and thus it is possible to reduce the driving voltage This is because the driving voltage decreases when a liquid crystal temperature increases. In addition, when the temperature increases in the middles of bars or in the middles of the slits, the temperature at the positions approximates an optimum value and transmittance may also increase.

As the material having a relatively high thermal conductivity, various metals, alloys, carbon nanotubes, etc., may be used. For example, aluminum (Al) has a thermal conductivity of 0.53 cal/cm$^2$/sec/° C., copper (Cu) has a thermal conductivity of 0.94 cal/cm$^2$/sec° C./, nickel (Ni) has a thermal conductivity of 0.22 cal/cm$^2$/sec/° C., and iron (F) has a thermal conductivity of 0.18 cal/cm$^2$/sec/° C. High thermal conductivity refers to a general thermal conductivity of metal, e.g., 0.1 cal/cm$^2$/sec/° C. or more.

When the patterns 154 are formed of a metallic material constituting the data line 150, the above-described effect can be naturally obtained. In particular, when the patterns 154 are formed of other materials having a higher thermal conductivity than the material constituting the data line 150, the above-described effect can be maximized.

Meanwhile, while depositing and patterning the data line 150 and source-drain electrodes 152, the patterns 154 can be formed together without an additional process. When a distance between the slits is 4 to 8 μm, the bar-shaped patterns 154 may be formed to a width of 1 to 1.5 μm in consideration of effective prevention of a disclination region and the influence of a reduction in aperture ratio. However, if only other process conditions are satisfied, the width of the bar-shaped patterns 154 can be reduced more. In addition, the patterns 154 are formed to extend to the edges of the slits such that a disclination region can be effectively prevented.

When the patterns 154 are formed, transmittance may be reduced a little, but the visibility of, for example, rainbow moiré is drastically reduced Even if the patterns 154 are regularly arranged, a space between them is narrow. Thus, a dispersion width excessively increases and the visibility of rainbow moiré is drastically reduced. In addition, since a reflective region of a transmissive region is formed, it is possible to increase the amount of light reflected and diffused through the transmissive region.

Figure 3:
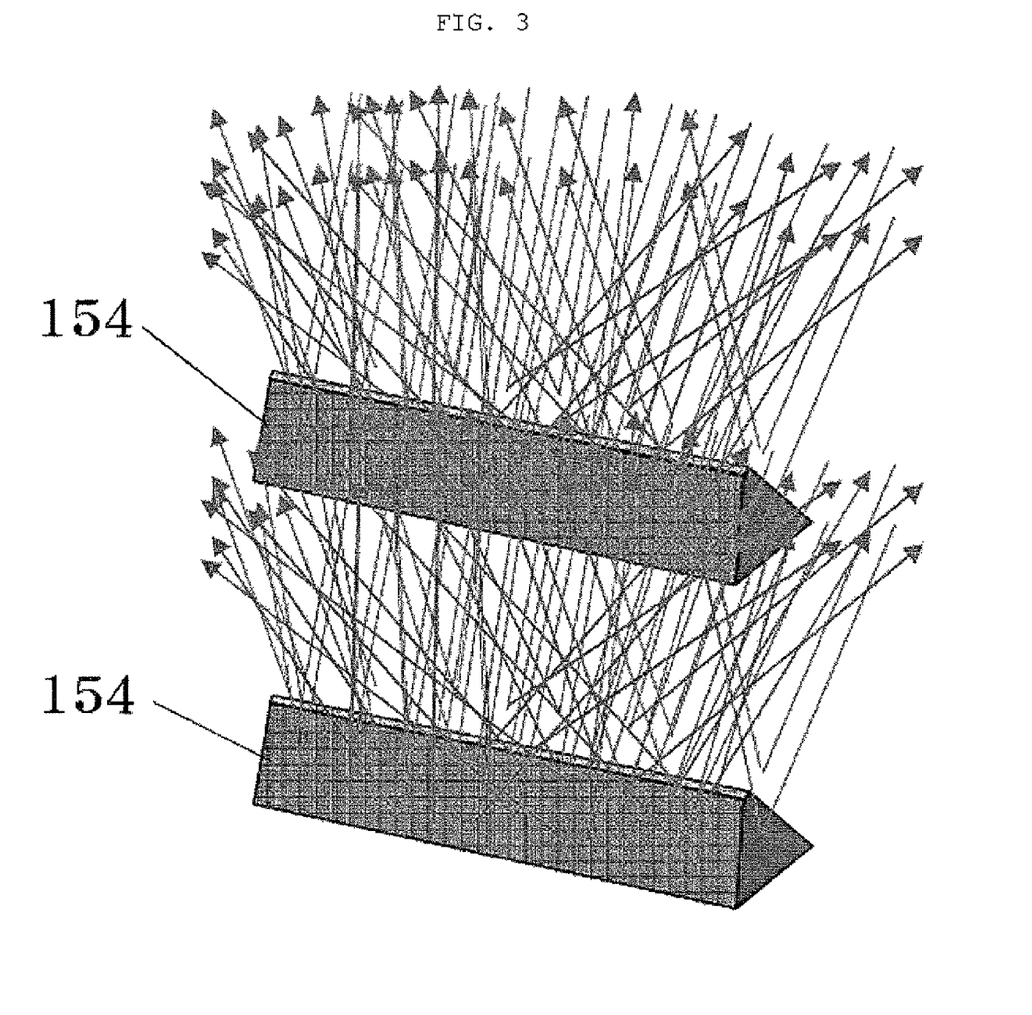
FIG. 3 illustrates an example of a pattern shape according to the first exemplary embodiment of the present invention.

FIG. 3 illustrates an example of a pattern shape according to an exemplary embodiment of the present invention. The pattern shape shown in FIG. 3 is a triangle. When the pattern has a narrow upper width and a wide lower width on the basis of a substrate, an inclination of 20 to 70 degrees, preferably 30 to 40 degrees, is obtained. Thus, diffused reflection effectively occurs, and reflected luminance can increase at a main visual angle.

Since the size of the pattern must be smaller than the interval between slits, the pattern may be formed to a lower width of 1 to 3 μm, preferably 1 to 1.5 μm, and can be formed in a triangular shape, a trapezoidal shape, etc., by etching.

Meanwhile, according to research conducted by the present inventors, a reflective region corresponding to about 30% of a conventional reflective plate region can be additionally obtained by forming a reflective shading plate using source-drain electrodes. When the edges of patterns actually contributing to diffused reflection are formed to be inclined, the reflective region may increase by about 80%, and outdoor visibility can be drastically improved. FIG. 3 shows an example in which the patterns 154 are formed in the middles of respective slits and in the middles of spaces, i.e., electrodes, between the slits. However, as mentioned above, the patterns 154 can be only formed in the middles of respective slits or in the middles of bars.

A method of manufacturing an FFS mode LCD according to an exemplary embodiment of the present invention will be described below with reference to FIGS. 1 and 2.

First, a transparent conductive layer is deposited on a lower substrate 100 and patterned to form a transparent common electrode 110 having a plate shape.

In addition, after an opaque metal is deposited on the transparent common electrode 110, gate lines 120 are formed in one side of the transparent common electrode 110, and common bus lines 122 are formed to cover a part of the transparent common electrode 110.

Subsequently, a gate insulating layer 130 is deposited on the entire surface of the lower substrate 100 on which the patterned transparent common electrode 110, the gate lines 120 and the common bus lines 122 are formed. Then, an a-Si layer and an n+ a-Si layer are successively deposited on the gate insulating layer 130 on the gate lines 120 and patterned to form an active layer 140a.

In addition, a metal layer is deposited on the entire surface of the lower substrate 100 on which the active layer 140a is formed, and then data lines 150 and source-drain electrodes 152 are formed by patterning the metal layer. At this time, bar-shaped patterns 154 having a specific width in a direction substantially parallel to the length direction of slits of a transparent pixel electrode 170 to be formed later, are formed in the middles of the respective slits and in the middles of spaces between the slits. An insulating layer 160 is deposited on the data lines 150, the source-drain electrodes 152 and the bar-shaped patterns 154.

Subsequently, contact holes CN are formed to expose a part of the source-drain electrodes 152, and then a transparent conductive layer is deposited on the insulating layer 160 to be connected with the source-drain electrodes 152 through the contact holes CN. Here, the transparent conductive layer is patterned to form the transparent pixel electrodes 170 having the slits. The bar-shaped patterns 154 have been formed in the middles of the respective slits of the transparent pixel electrodes 170 and in the middles of spaces between the slits.

COMPARATIVE EXAMPLE

Figure 4A:
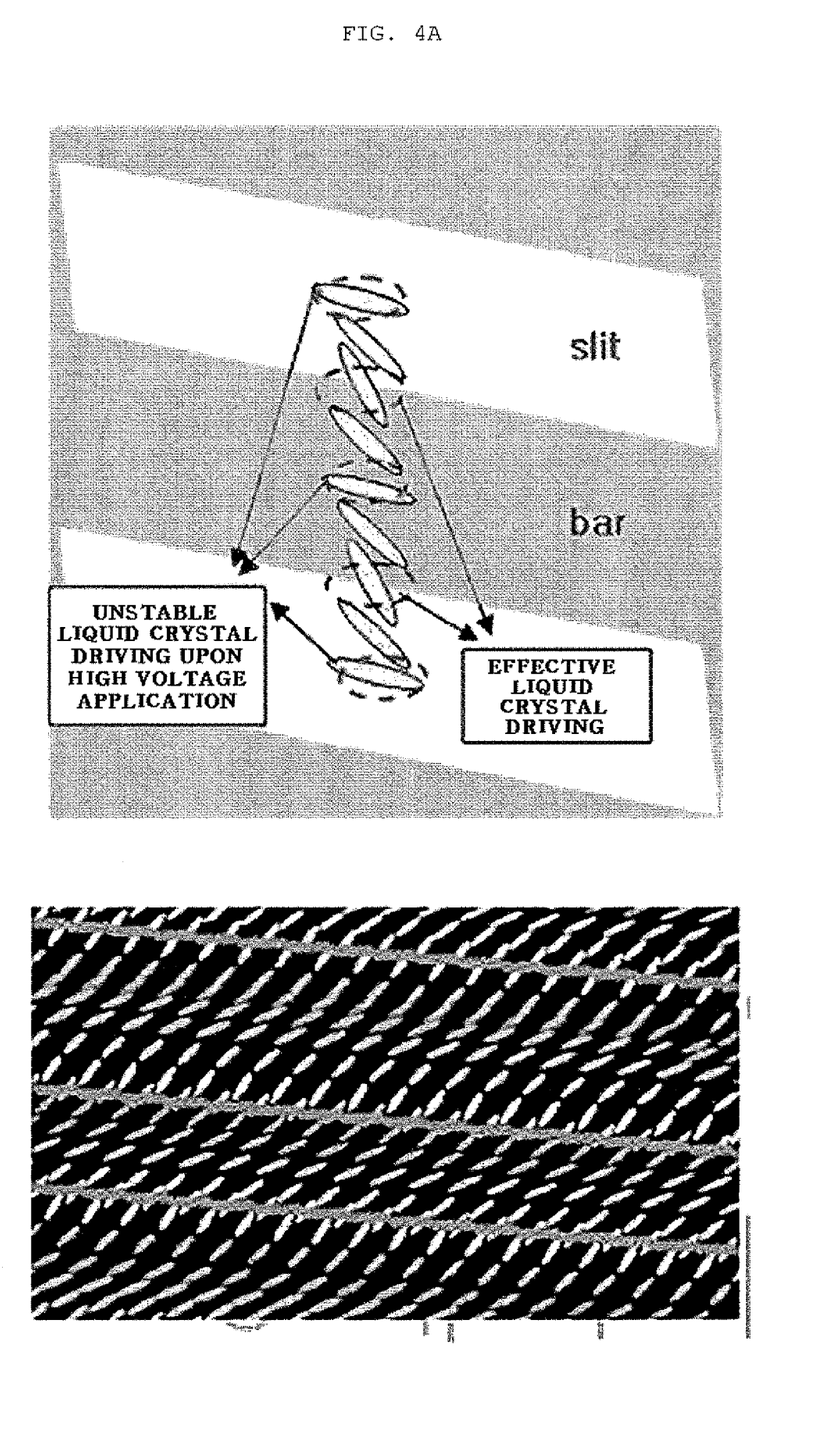
FIGS. 4A and 4B illustrate simulation results of movement of liquid crystal operated at high voltage in an opening region to describe comparative examples according to whether or not a pattern exists.
Figure 4B:
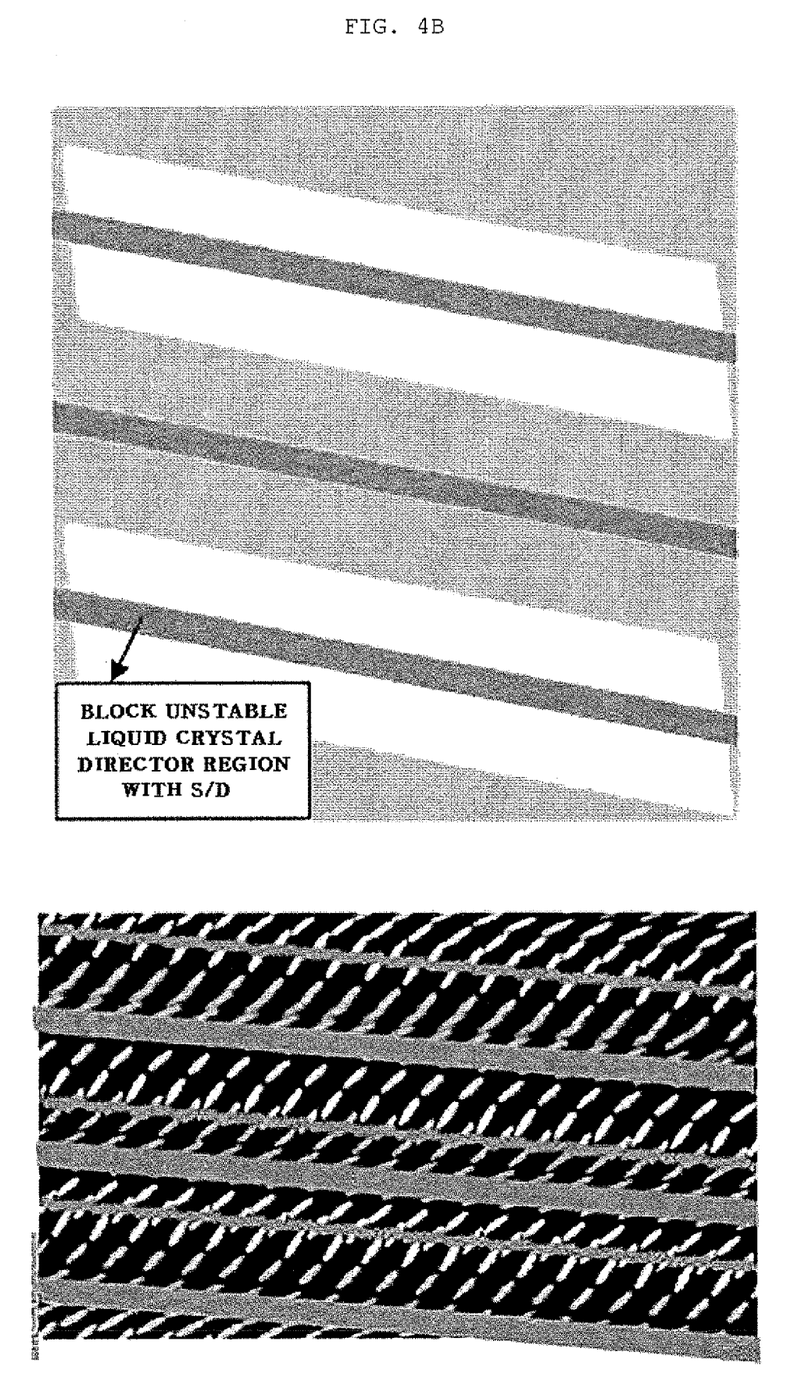

FIGS. 4A and 4B illustrate simulation results of movement of liquid crystal driven at high voltage in an opening region to describe a comparative example according to whether or not a pattern exists.

Referring to FIG. 4A, in the middles of slits and bars of an electrode, liquid crystal is outside of the range of an electric field generated by an applied pixel voltage and does not properly rotate. That liquid crystal is driven in a different direction from liquid crystal in other positions. Thus, a liquid crystal transmittance varies in one pixel, and it is difficult to display a desired color. Consequently, screen quality deteriorates.

On the other hand, FIG. 4B illustrates a transparent pixel electrode in which bar-shaped patterns having a specific width in a direction substantially parallel to the length direction of respective slits of the electrode are formed in the middles of the respective slits and in the middles of spaces between the slits. The middles of the respective slits and bars at which liquid crystal is driven in an unstable direction are covered by source-drain electrodes, thereby preventing color deterioration caused by the unstable region and improving screen quality.

Figure 5A:
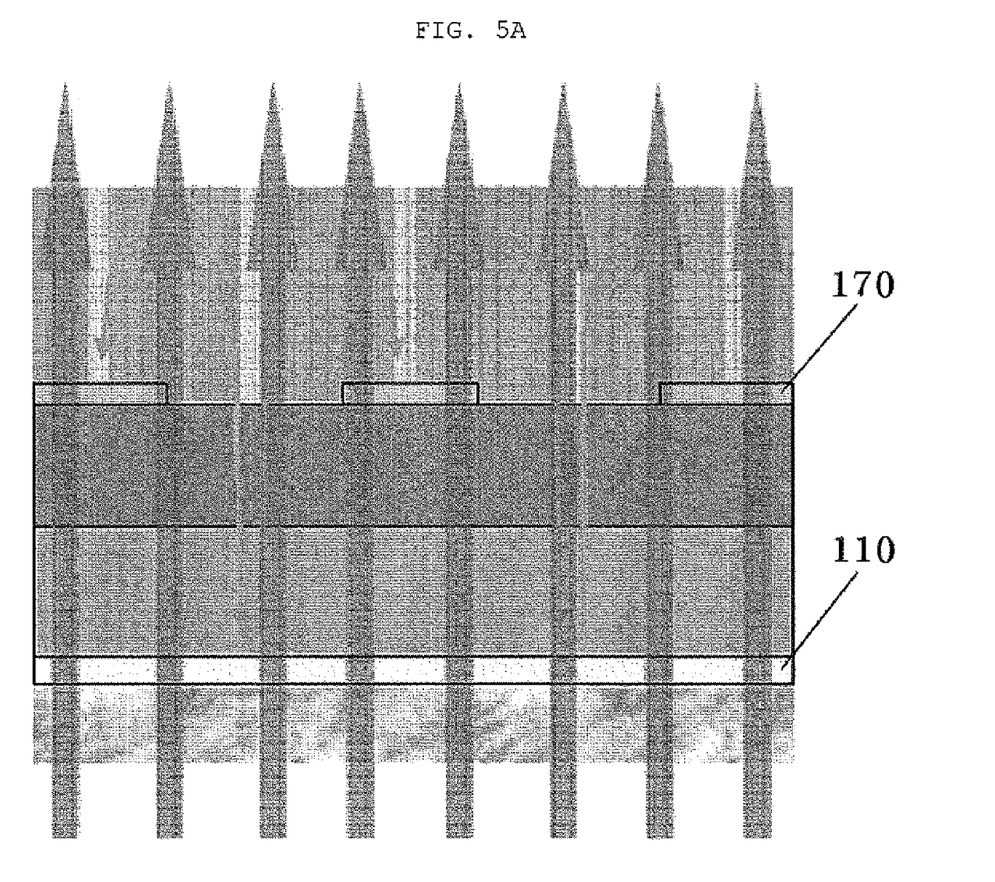
FIGS. 5A and 5B illustrate reduction of disclination according to whether or not a pattern is formed.
Figure 5B:
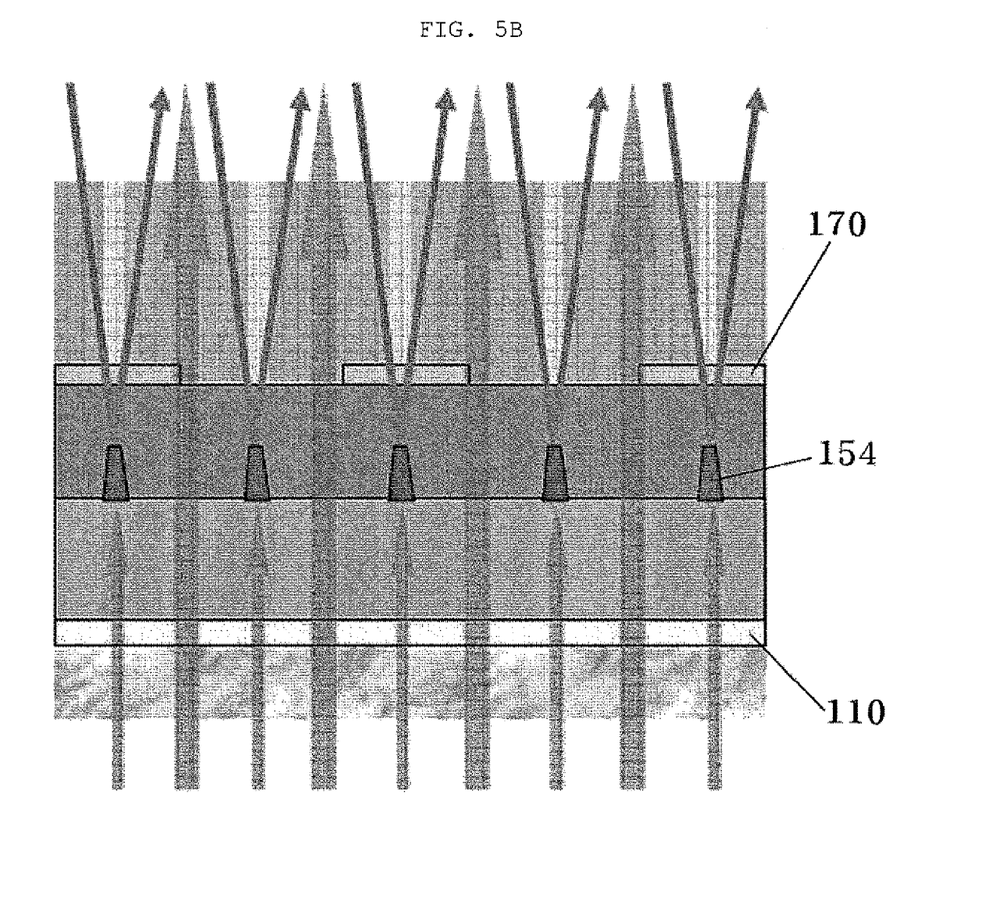

FIGS. 5A and 5B illustrate reduction of disclination according to whether or not a pattern is formed, showing simulation results of movement of liquid crystal driven at high voltage in an opening region to describe comparative examples. In a structure in which patterns are not formed, light from a backlight is transmitted through both a strong electric field region, which has normal electric field intensity, and a weak electric field region, which has low electric field intensity and causes disclination. Both the strong electric field region and the weak electric field region are included in an electric field region formed by a transparent common electrode 110 and a transparent pixel electrode 170. On the other hand, in a structure in which patterns 154 are formed, light transmitted from a backlight to the weak electric field region is blocked using a material constituting a data line, thereby displaying a uniform color.

Meanwhile, the patterns 154 used as a shading layer are also used as a reflective plate. As illustrated in FIG. 5B, outdoor visibility can be increased by expanding reflective regions together with reflective outdoor paths.

Second Exemplary Embodiment

A second exemplary embodiment of the present invention will be described with reference to FIG. 6.

Figure 6:
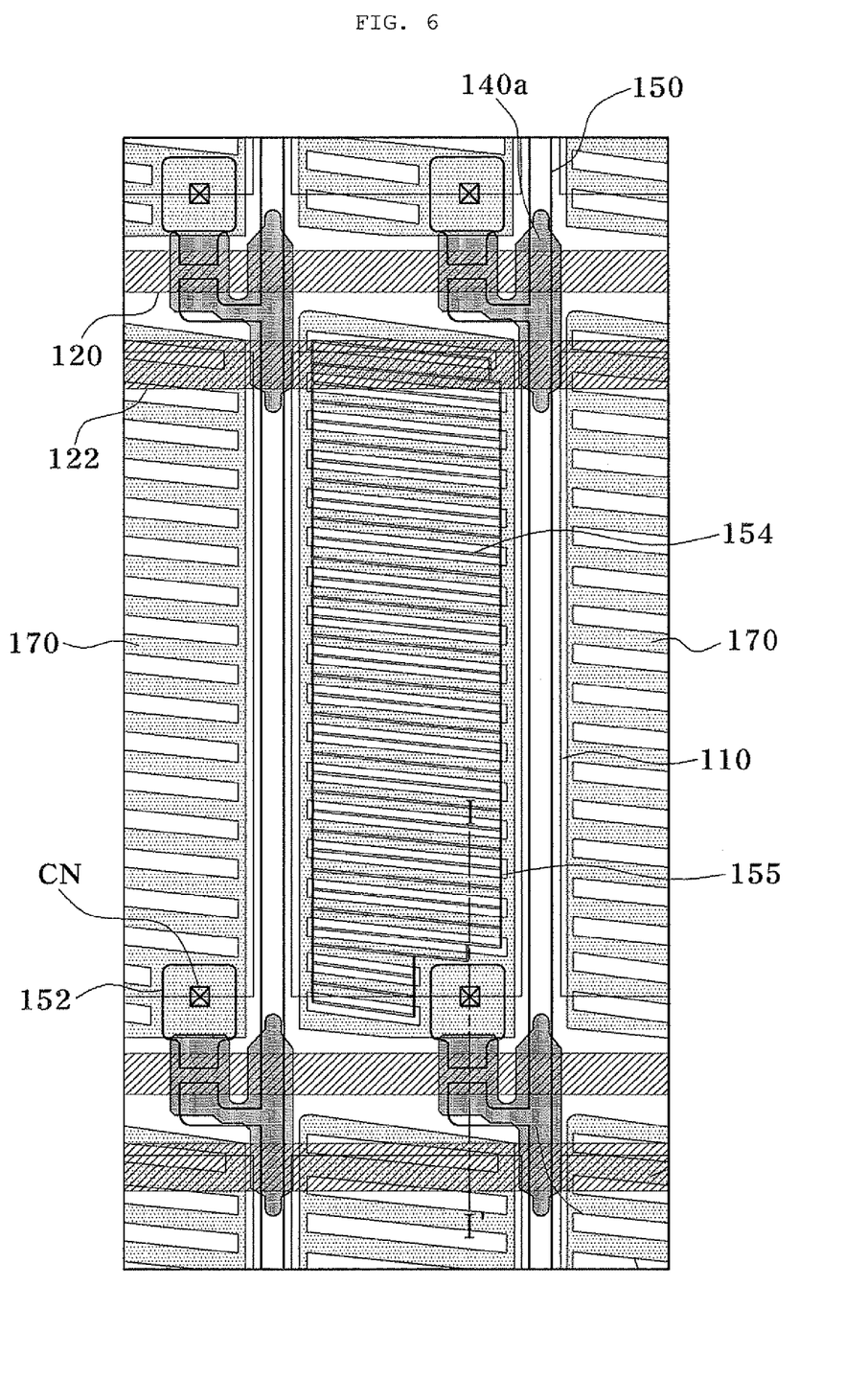
FIG. 6 is a plan view of a part of pixel regions on a lower substrate of an FFS mode LCD according to a second exemplary embodiment of the present invention.

FIG. 6 is a plan view of a part of pixel regions formed on a lower substrate of an FFS mode LCD according to the second exemplary embodiment of the present invention.

The FFS mode LCD of FIG. 6 will be described focusing on differences from the FFS mode LCD of FIG. 1. In the middles of respective slits of a transparent pixel electrode 170 and in the middles of spaces between the slits, bar-shaped patterns 154 having a specific width in a direction substantially parallel to the length direction of the slits are formed. In addition, a connection bar 140c is connected to the respective patterns 154 substantially perpendicular to the length direction of the slits at the edges of the slits.

According to the additional connection bar 140c, disclination occurring at the edges of the slits can be reduced, and the patterns 154 are formed to extend to the edges of the slits such that a disclination region can be effectively prevented.

Third Exemplary Embodiment

A third exemplary embodiment of the present invention will be described below, focusing on differences from the above-described embodiments.

Figure 7:
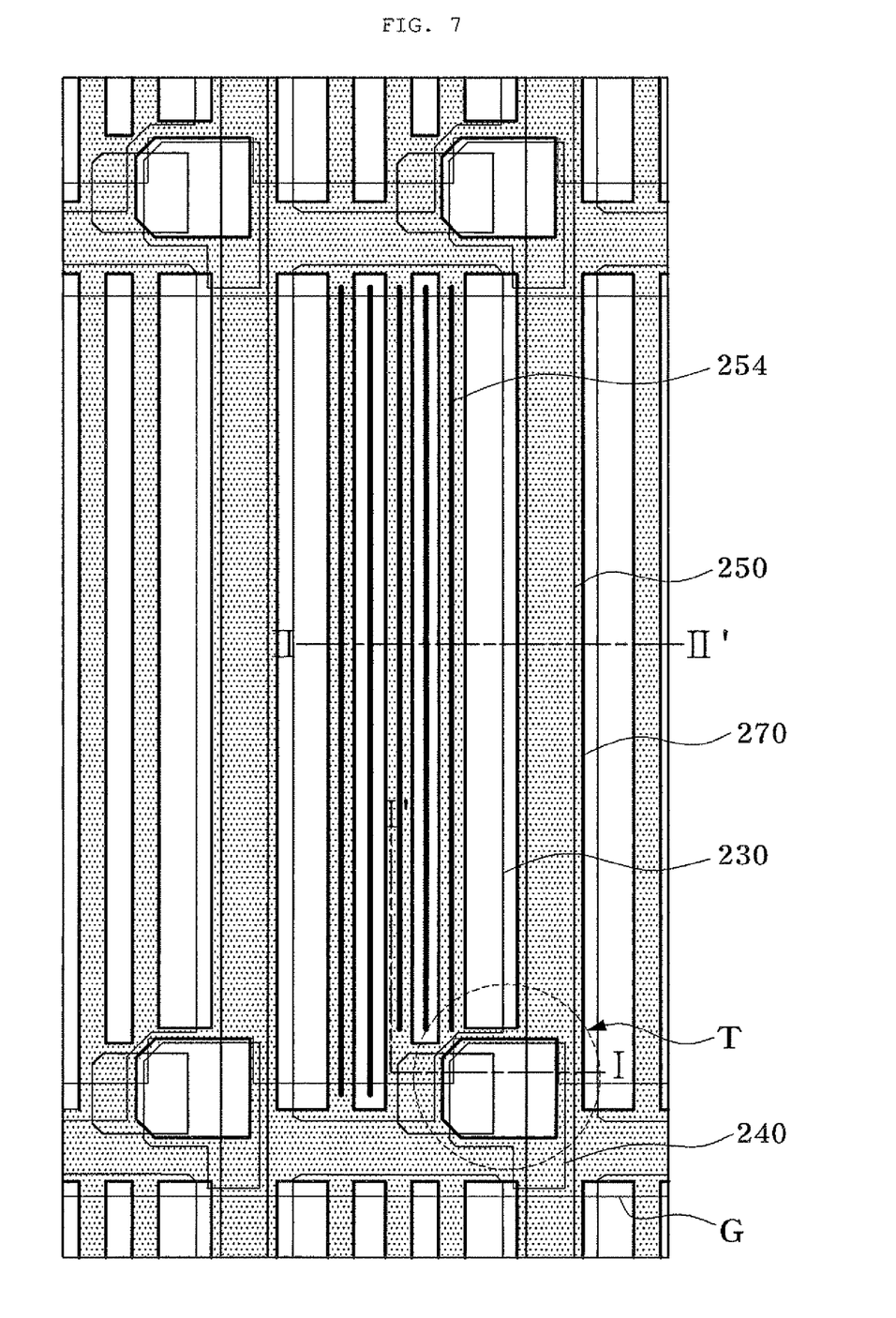
FIG. 7 is a plan view of a part of pixel regions formed on a lower substrate of an FFS mode LCD according to a third exemplary embodiment of the present invention.
Figure 8:
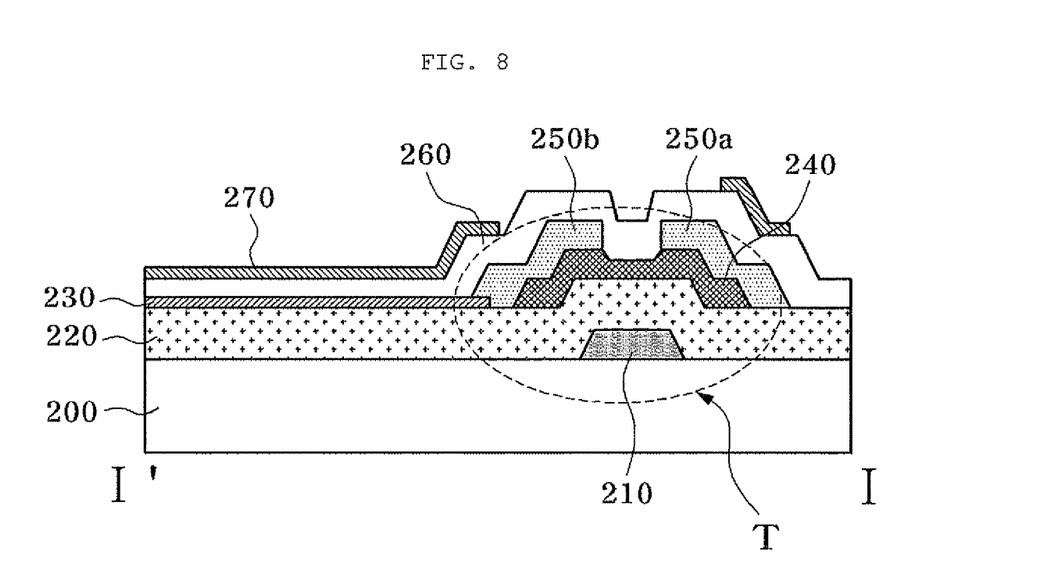
FIG. 8 is a cross-sectional view taken along line I-I' of FIG. 7.

FIG. 7 is a plan view of a part of pixel regions on a lower substrate of an FFS mode LCD according to the third exemplary embodiment of the present invention. FIG. 8 is a cross-sectional view taken along line I-I' of FIG. 7, and FIG. 9 is a cross-sectional view taken along line II-II' of FIG. 7.

Figure 9:
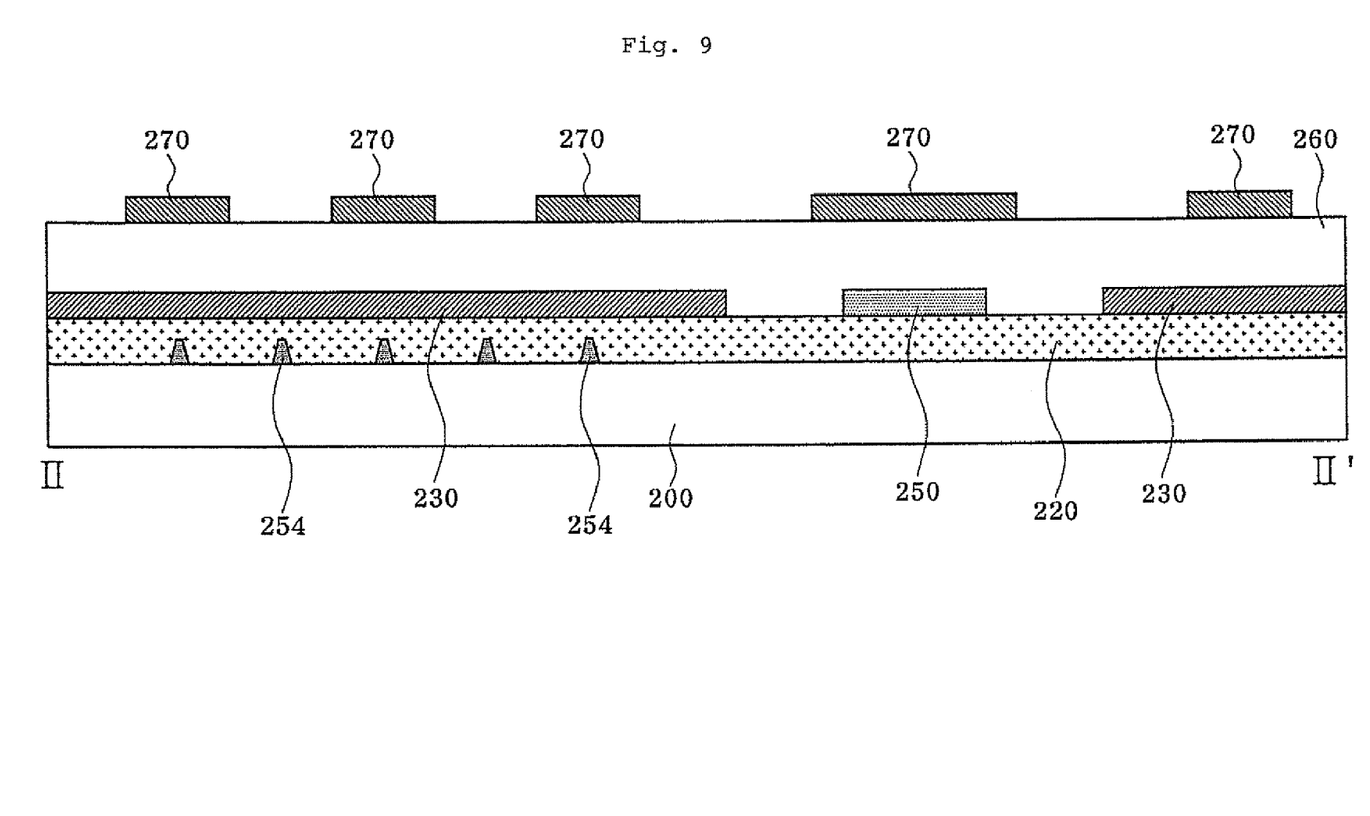
FIG. 9 is a cross-sectional view taken along line II-II' of FIG. 7.

Referring to FIGS. 7, 8 and 9, a gate line G formed of an opaque metal and a data line 250 are arranged to cross at right angles, thereby forming a unit pixel In such a unit pixel region, a transparent pixel electrode 270 and a transparent pixel electrode 230 are disposed with an insulating layer 260 interposed between them. The transparent pixel electrode 230 has a plate shape and is disposed on the same layer as the data line 250. The transparent common electrode 270 is formed to have a plurality of comb teeth by patterning a transparent conductive layer deposited on the insulating layer 260, and partially overlaps the transparent pixel electrode 230.

On a gate electrode 210 in the gate line G, an active pattern 240 in which an a-Si layer and an n+ a-Si layer are deposited in sequence and source and drain electrodes 250a and 250b are disposed with a gate insulating layer 220 interposed between the gate electrode 210 and the active pattern 240 and the source and drain electrodes 250a and 250b, thereby forming a TFT T. The drain electrode 250b is electrically connected with the transparent pixel electrode 230 such that a data signal is applied to the unit pixel.

According to the third exemplary embodiment, from the plan view, bar-shaped patterns 254 having a specific width in a direction substantially parallel to the length direction of slits of the transparent common electrode 270 are formed in the middles of the respective slits and in the middles of bars. FIG. 7 illustrates an example in which the patterns 254 are formed both in the middles of the respective slits and in the middles of bars, but in practice, the patterns 254 may be only formed in the middles of the respective slits or in the middles of spaces between the slits. Also in this case, the present invention has a desired effect.

The patterns 254 can be fabricated using various materials without any special limitation, and can be formed by separately depositing a layer. When a material constituting the gate line G is used, it is possible to facilitate the process.

A method of manufacturing an FFS mode LCD according to an exemplary embodiment of the present invention will be described in detail with reference to FIGS. 7, 8 and 9.

Referring to FIGS. 7, 8 and 9, the gate line G including the gate electrode 210 is formed on the lower substrate 200. More specifically, an opaque metal layer is deposited on the lower substrate 200 and patterned to form the gate line G including the gate electrode 210 in the portion of the TFT T on the lower substrate 200. While the gate line G is formed, the bar-shaped patterns 254 having a specific width in a direction substantially parallel to the length direction of slits of the transparent common electrode 270 to be formed are formed together in the middles of the respective slits and in the middles of spaces, i.e., electrodes, between the slits.

Subsequently, the gate insulating layer 220 is deposited to cover the gate line G including the gate electrode 210, and then the plate-shaped transparent pixel electrode 230 is formed to be disposed in each pixel region by depositing and patterning a transparent conductive layer on the gate insulating layer 220.

On the resultant substrate, an a-Si layer and an n+ a-Si layer are deposited in sequence and patterned to form the active layer 240 on the gate insulating layer 220 above the gate electrode 210.

After a metal layer for a source and drain is deposited, it is patterned to form to the data line 250 including the source and drain electrodes 250a and 250b, thereby forming the TFT T. Here, the drain electrode 250b is formed to be electrically connected with the transparent pixel electrode 230.

Subsequently, the insulating layer 260 made of, for example, SiNx is deposited on the resultant structure in which the TFT T is formed, and then the transparent common electrode 270 having a comb teeth shape is formed to partially overlap the transparent pixel electrode 230. After this, although not shown in the drawings, an alignment layer is deposited on the uppermost part of the resultant substrate in which the transparent common electrode 270 is formed, thereby completing fabrication of an array substrate.

According to the above-described FFS mode LCD and method of manufacturing the same, it is possible to remarkably reduce disclination caused by unsmooth liquid crystal driving. In particular, it is possible to solve a problem of screen quality deterioration caused by liquid crystal that is not uniformly aligned at high voltage.

In addition, patterns are formed of a material constituting data lines, and it is possible to display uniform color through a relatively simple process.

Furthermore, a reflective region is additionally included such that indoor and outdoor readability can be drastically improved.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A fringe field switching (FFS) mode liquid crystal device (LCD) in which a lower substrate, an upper substrate and a liquid crystal layer interposed between the substrates are included, each pixel region is defined on the lower substrate by gate lines and data lines formed in crossing directions, and switching devices are disposed at intersections of the gate lines and the data lines, the FFS mode LCD comprising:
   a first transparent electrode and a second transparent electrode,
   wherein the second transparent electrode have a plurality of slits and bars, disposed apart from the first transparent electrode with an insulating layer interposed between the first and second transparent electrodes, in the pixel region to apply a voltage level to the liquid crystal layer and control an amount of transmitted light,
   wherein, from a plan view, bar-shaped elements having a specific width in a direction substantially parallel to a length direction of the slits are formed in the middles of the respective slits or in the middles of the bars, and
   wherein the bar-shaped elements are configured to reduce visibility of disclination.

2. The FFS mode LCD of claim 1, wherein the bar-shaped elements are formed of a material constituting the data lines.

3. The FFS mode LCD of claim 1, wherein the first transparent electrode has a slit shape having a plurality of slits or a plate shape.

4. The FFS mode LCD of claim 1, wherein the respective bar-shaped elements have a narrower upper width than lower width, based on the substrate.

5. The FFS mode LCD of claim 1, wherein the respective bar-shaped elements have a lower width of 1 to 1.5 µm.

6. The FFS mode LCD of claim 1, further comprising:
   an additional bar connecting each other the bar-shaped elements at edges of the slits.

7. The FFS mode LCD of claim 1, wherein the bar-shaped elements are formed in the middles of the respective slits and in the middles of the bars.

8. The FFS mode LCD of claim 1, wherein the bar-shaped elements are formed of a material having a high thermal conductivity.

9. A method of manufacturing a fringe field switching (FFS) mode liquid crystal display (LCD) in which a lower substrate, an upper substrate and a liquid crystal layer interposed between the substrates are included, each pixel region is defined on the lower substrate by gate lines and data lines formed in crossing directions, and switching devices are disposed at intersections of the gate lines and the data lines, the method comprising:
   forming a first transparent electrode on the lower substrate; and
   forming the gate lines, a gate insulating layer, an active layer, the data lines, an insulating layer and a second transparent electrode on the first transparent electrode in sequence, the second transparent electrode having a plurality of slits and bars,
   wherein in forming the data lines, from a plan view, bar-shaped elements having a specific width are formed in a direction substantially parallel to a length direction of slits of the second transparent electrode in the middles of the respective slits or in the middles of the respective bars together with the data lines, and
   wherein the bar-shaped elements are configured to reduce visibility of disclination.

10. A method of manufacturing a fringe field switching (FFS) mode liquid crystal display (LCD) in which a lower substrate, an upper substrate and a liquid crystal layer interposed between the substrates are included, each pixel region is defined on the lower substrate by gate lines and data lines formed in crossing directions, and switching devices are disposed at intersections of the gate lines and the data lines, the method comprising:
   forming the gate lines and bar-shaped elements having a specific width on the lower substrate; and
   forming a gate insulating layer, an active layer, a first transparent electrode, the data lines, an insulating layer and a second transparent electrode on the structure, the second transparent electrode having a plurality of slits and bars,
   wherein, in forming the bar-shaped elements, from a plan view, the bar-shaped elements are formed in a direction substantially parallel to a length direction of slits of the second transparent electrode in the middles of the respective slits or in the middles of bars, and
   wherein the bar-shaped elements are configured to reduce visibility of disclination.

11. The method of claim 9, wherein the respective bar-shaped elements have a narrower upper width than lower width, based on the substrate.

12. The method of claim 9, wherein the bar-shaped elements have a lower width of 1 to 1.5 µm.

13. The method of claim 9, wherein the step of forming the data lines comprises forming an additional bar connecting the bar-shaped elements at edges of the slits together with the data lines.

14. The method of claim 9, wherein the bar-shaped elements are formed in the middles of the respective slits and in the middles of spaces between the slits.

15. The method of claim 9, wherein the bar-shaped elements are formed of a material having a high thermal conductivity.

16. The method of claim 10, wherein the respective bar-shaped elements have a narrower upper width than lower width, based on the substrate.

17. The method of claim 10, wherein the bar-shaped elements have a lower width of 1 to 1.5 µm.

18. The method of claim 10, wherein the bar-shaped elements are formed in the middles of the respective slits and in the middles of spaces between the slits.

19. The method of claim 10, wherein the bar-shaped elements are formed of a material having a high thermal conductivity.

* * * * *